(12) United States Patent
Sarrafi-Nour et al.

(10) Patent No.: US 8,168,259 B2
(45) Date of Patent: May 1, 2012

(54) ARTICLES FOR HIGH TEMPERATURE SERVICE AND METHODS FOR THEIR MANUFACTURE

(75) Inventors: Reza Sarrafi-Nour, Clifton Park, NY (US); Krishan Lal Luthra, Niskayuna, NY (US); Peter Joel Meschter, Niskayuna, NY (US); Curtis Alan Johnson, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 12 days.

(21) Appl. No.: 12/905,316

(22) Filed: Oct. 15, 2010

(65) Prior Publication Data

US 2011/0027483 A1 Feb. 3, 2011

Related U.S. Application Data

(62) Division of application No. 11/768,467, filed on Jun. 26, 2007, now Pat. No. 7,968,217.

(51) Int. Cl.
*B05D 3/02* (2006.01)

(52) U.S. Cl. .......... 427/376.2; 427/372.2; 427/375; 427/376.1; 427/419.1; 427/419.2; 501/64; 501/68; 501/152

(58) Field of Classification Search .......... 427/284, 427/331, 372.2, 375, 376.1, 376.2, 419.1, 427/419.2; 416/241 R, 241 B; 501/64, 68, 501/152
See application file for complete search history.

(56) References Cited

U.S. PATENT DOCUMENTS

| | | |
|---|---|---|
| 3,573,078 A | 3/1971 | Bacon |
| 6,296,941 B1 | 10/2001 | Eaton, Jr. et al. |
| 6,410,148 B1 | 6/2002 | Eaton, Jr. et al. |
| 6,617,037 B2 | 9/2003 | Sun et al. |
| 6,759,151 B1 | 7/2004 | Lee |
| 7,399,720 B1 * | 7/2008 | Brow et al. ............. 501/17 |
| 7,595,114 B2 | 9/2009 | Meschter et al. |
| 2006/0029733 A1 | 2/2006 | Bhatia et al. |

* cited by examiner

*Primary Examiner* — Gwendolyn Blackwell
(74) *Attorney, Agent, or Firm* — Paul J. DiConza

(57) ABSTRACT

An article for use in aggressive environments is presented. In one embodiment, the article comprises a substrate and a self-sealing and substantially hermetic sealing layer disposed over the bondcoat. The substrate may be any high-temperature material, including, for instance, silicon-bearing ceramics and ceramic matrix composites. A method for making such articles is also presented. The method comprises providing a substrate; disposing a self-sealing layer over the substrate; and heating the sealing layer to a sealing temperature at which at least a portion of the sealing layer will flow.

17 Claims, 2 Drawing Sheets

ARTICLES FOR HIGH TEMPERATURE SERVICE AND METHODS FOR THEIR MANUFACTURE

CROSS-REFERENCE TO RELATED APPLICATIONS

Figure 1:
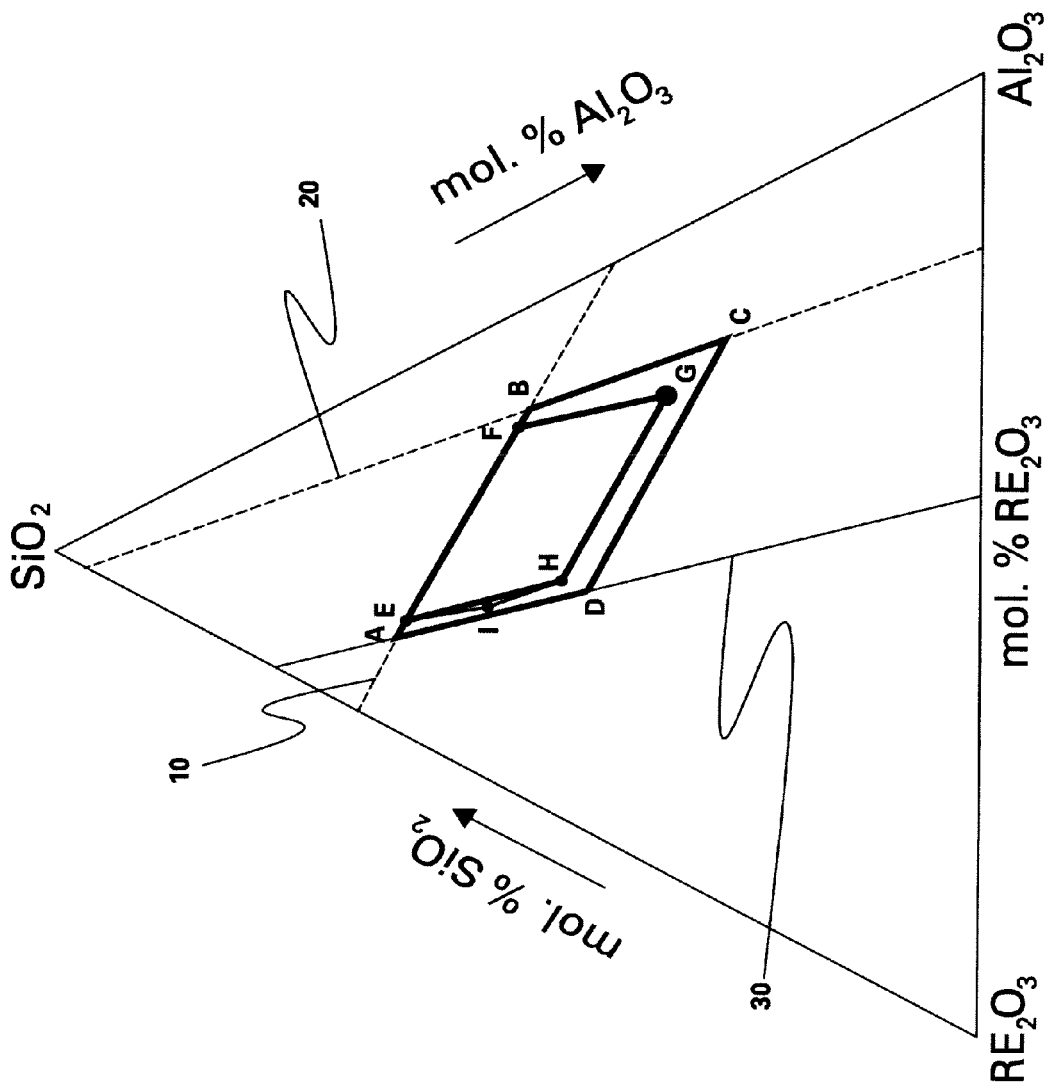

This application is a divisional of U.S. patent application Ser. No. 11/768,467, entitled "ARTICLES FOR HIGH TEMPERATURE SERVICE AND METHODS FOR THEIR MANUFACTURE", filed 26 Jun. 2007, which is herein incorporated by reference.

BACKGROUND

This invention relates to high-temperature machine components. More particularly, this invention relates to coating systems for protecting machine components from exposure to high-temperature environments. This invention also relates to methods for protecting articles.

High-temperature materials, such as, for example, ceramics, alloys, and intermetallics, offer attractive properties for use in structures designed for service at high temperatures in such applications as gas turbine engines, heat exchangers, and internal combustion engines, for example. However, the environments characteristic of these applications often contain reactive species, such as water vapor, which at high temperatures may cause significant degradation of the material structure. For example, water vapor has been shown to cause significant surface recession and mass loss in silicon-bearing materials. The water vapor reacts with the structural material at high temperatures to form volatile silicon-containing species, often resulting in unacceptably high recession rates.

Environmental barrier coatings (EBC's) are applied to silicon-bearing materials and other material susceptible to attack by reactive species, such as high temperature water vapor; EBC's provide protection by prohibiting contact between the environment and the surface of the material. EBC's applied to silicon-bearing materials, for example, are designed to be relatively stable chemically in high-temperature, water vapor-containing environments. One exemplary conventional EBC system, as described in U.S. Pat. No. 6,410,148, comprises a silicon or silica bond layer applied to a silicon-bearing substrate; an intermediate layer comprising mullite or a mullite-alkaline earth aluminosilicate mixture deposited over the bond layer; and a top layer comprising an alkaline earth aluminosilicate deposited over the intermediate layer. In another example, U.S. Pat. No. 6,296,941, the top layer is a yttrium silicate layer rather than an alumino silicate.

The above coating systems can provide suitable protection for articles in demanding environments, but opportunities for improvement in coating performance exist. Current EBC technology generally uses plasma spray processes to deposit the coatings, primarily because of the flexibility of the process to deposit a large variety of materials, its ability to provide a wide spectrum of coating thicknesses without major process modifications, and the relative ease of depositing a coating layer. However, ceramic coatings processed by plasma spraying often contain undesirable open porosity in the form of a network of fine cracks ("microcracks") intercepting otherwise closed pores and voids. The microcrack network is formed primarily by quench and solidification cracks and voids inherent in the coating deposition process; cracks often form between layers of successively deposited material and between the individual "splats" formed when melted or partially melted particles are sprayed onto the coating surface. For EBC applications, open porosity in the coating can be detrimental. It provides a rapid path for penetration of water vapor and other gaseous species and, hence, accelerated localized deterioration of the underlying coating layers.

Various methods have been implemented to alleviate the problem of open porosity in ceramic coatings. In some applications, the coatings are applied onto a hot substrate (T>800 C) using plasma spray processing. Deposition on a hot substrate reduces the difference between the substrate temperature and the melting temperature of the coating material, and thus reduces the tendency for formation of quench cracks. However, extension of the hot deposition process technique to large components is challenging, owing to the high substrate temperatures and the constraints associated with manipulation of the parts and the coating hardware. In other applications, the plasma sprayed EBC coating is submitted to a post-deposition process to impregnate the non-hermetic coating structure with precursors of suitable materials, for example, soluble organic and inorganic salts and alcoxides that yield upon heat-treatment a final pore-filling material compatible with the coating matrix. The filler material blocks or restricts the pathway for water vapor penetration. Such a process is described in U.S. patent application Ser. No. 11/298,735. Although this method is relatively easy to implement, it may require multiple impregnation-burnout cycles to achieve coating permeability improvements, and in certain cases may provide an incompletely hermetic coating structure.

Therefore, there is a need for articles protected by robust coating systems having improved capability to serve as a barrier to water vapor and other detrimental environmental species. There is also a further need for methods to produce these articles economically and reproducibly.

BRIEF DESCRIPTION

Embodiments of the present invention are provided to meet this and other needs. One embodiment is an article comprising a substrate and a self-sealing and substantially hermetic sealing layer disposed over the substrate. The substrate may be any high-temperature material, including, for instance, silicon-bearing ceramics and ceramic matrix composites.

Another embodiment is an article comprising a substrate comprising silicon; a bondcoat disposed over the substrate, the bondcoat comprising silicon; a self-sealing and substantially hermetic sealing layer disposed over the bondcoat; an intermediate layer disposed between the sealing layer and the bondcoat, wherein the intermediate layer comprises a barrier material that is substantially inert with respect to silica; and a topcoat disposed over the sealing layer. The sealing layer comprises a rare-earth aluminosilicate having a composition in the range bounded by a region in alumina/silica/rare-earth oxide compositional space defined by (1) a first line connecting a first composition point at (10 mole % alumina, 62 mole % silica, 28 mole % rare-earth oxide) with a second composition point at (40.5 mole % alumina, 48.5 mole % silica, 11 mole % rare-earth oxide); (2) a second line connecting a third composition point at (58.3 mole % alumina, 27.8 mole % silica, 14 mole % rare-earth oxide) with a fourth composition point at (24.5 mole % alumina, 42.5 mole % silica, 33 mole % rare-earth oxide); (3) a third line connecting the first composition point with the fourth composition point; and (4) a fourth line connecting the second composition point with the third composition point.

Another embodiment is a method for making an article. The method comprises providing a substrate; disposing a self-sealing layer over the substrate; and heating the sealing layer to a sealing temperature at which at least a portion of the sealing layer will flow.

Another embodiment is a method for making an article. The method comprises providing a substrate comprising silicon; disposing a bondcoat over the substrate, the bondcoat comprising silicon; disposing an intermediate layer over the bondcoat, wherein the intermediate layer comprises a barrier material that is substantially inert with respect to silica; disposing a self-sealing layer over the intermediate layer; heating the sealing layer to a sealing temperature at which at least a portion of the sealing layer will flow and maintaining the sealing layer at the sealing temperature for an effective time to form a substantially hermetic layer; and disposing a topcoat over the sealing layer. The self-sealing layer comprises a rare earth aluminosilicate having a composition in the range bounded by a region in alumina/silica/rare-earth oxide compositional space defined by (1) a first line connecting a first composition point at (10 mole % alumina, 62 mole % silica, 28 mole % rare-earth oxide) with a second composition point at (40.5 mole % alumina, 48.5 mole % silica, 11 mole % rare-earth oxide); (2) a second line connecting a third composition point at (58.3 mole % alumina, 27.8 mole % silica, 14 mole % rare-earth oxide) with a fourth composition point at (24.5 mole % alumina, 42.5 mole % silica, 33 mole % rare-earth oxide); (3) a third line connecting the first composition point with the fourth composition point; and (4) a fourth line connecting the second composition point with the third composition point.

DRAWINGS

Figure 2:
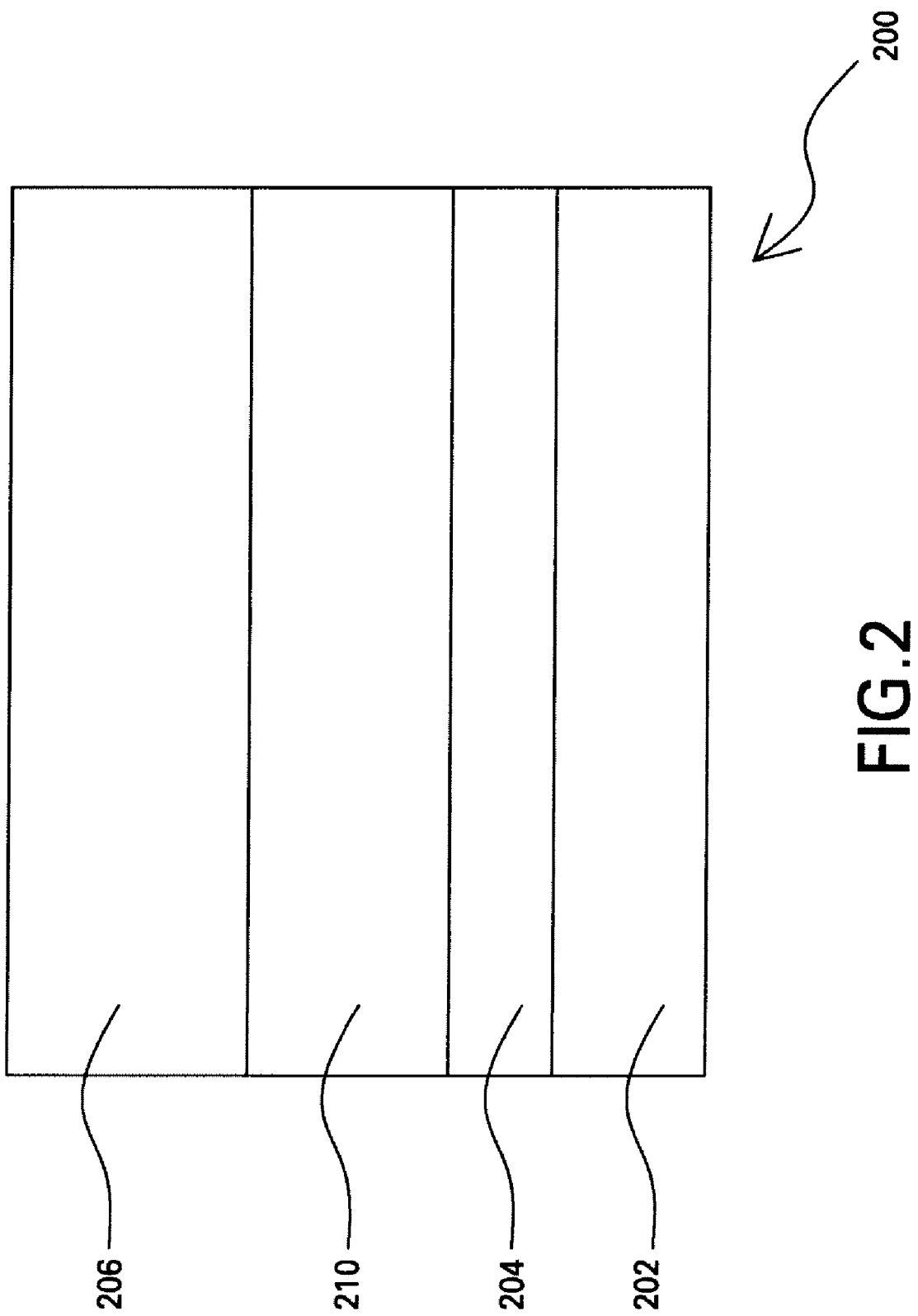

These and other features, aspects, and advantages of the present invention will become better understood when the following detailed description is read with reference to the accompanying drawings in which like characters represent like parts throughout the drawings, wherein:

FIG. 1 is a schematic illustration of alumina/silica/rare-earth oxide compositional space, drawn for convenience on a ternary-style composition diagram of a type commonly used in the art, with certain compositions highlighted in accordance with embodiments of the present invention; and FIG. 2 is a schematic cross-section illustration of one exemplary embodiment of the present invention;

DETAILED DESCRIPTION

According to one embodiment of the present invention, an article comprises a substrate and a self-sealing and substantially hermetic coating, referred to herein as a "sealing layer," disposed over the substrate. The term "self-sealing" as used herein means that at least a fraction of the coating is made of material ("sealing material") capable of forming a flowable phase, such as a liquid or a glassy phase, at or above a known temperature ("sealing temperature") that is below a melting temperature of the bulk of the coating. This liquid or glassy phase has a viscosity at the sealing temperature suitable to allow the flowable phase to flow into and at least partially fill defects such as cracks and pores, thereby enhancing the ability of the coating to block the movement of detrimental species from the external environment into the substrate. By this mechanism, the coating can seal itself; that is, it can increase its resistance to transport of detrimental species without the use of, for example, a separate sealing material deposited within pores and cracks. Thus, in some embodiments, the sealing layer is substantially free of any additional material disposed within internal surfaces of the sealing layer; this limitation, of course, does not preclude embodiments where an additional layer is disposed over the sealing layer. The term "substantially hermetic" as used herein means that the coating shows a gas permeability that is below about $2 \times 10^{-14}$ cm$^2$ (about $2 \times 10^{-6}$ Darcy), the detection limit of commonly used measurement techniques.

The fraction of the sealing layer made of the sealing material may be selected depending on a number of factors, including, for example, the expected density of defects that need to be sealed and the expected viscosity of the flowable phase. In some embodiments, this fraction is at least about 1% by volume of total sealing layer; in particular embodiments, the fraction is at least 10% by volume.

The sealing temperature typically is related to a phase transition or transformation that occurs within the sealing material. For instance, the sealing temperature may be chosen to be above a glass transition temperature for a glassy phase that forms in the sealing material. Alternatively, the sealing temperature may be chosen to be at or above a melting temperature, such as a eutectic temperature or a solidus temperature, for a particular phase or composition present in the sealing material. In some embodiments, the sealing temperature is at least about 900 degrees Celsius, and in particular embodiments, the sealing temperature is at least about 1300 degrees Celsius. In certain embodiments, the operating temperature of the article is selected to be below the sealing temperature, so that the coating will not re-form a flowable phase during service. However, there may be certain applications where having a flowable phase in the sealing layer during service is acceptable or desirable, and so embodiments of the present invention also include those where the sealing temperature is below the service temperature.

In general terms, the composition of the sealing layer is selected so that, at a given selected sealing temperature, at least a fraction of the sealing layer is either a liquid or a flowable glassy phase, as described above. The phase transformation behavior as a function of composition and temperature is well known in the art for many materials, and thus the procedure for selecting suitable materials for use in embodiments of the present invention will be apparent to practitioners based on the general descriptions presented herein. In addition to the phase transformation characteristics described above, other material characteristics such as, for instance, environmental resistance, ease of manufacture, chemical compatibility with adjacent materials, and other properties, are generally taken into account when selecting a particular material for use in a specific application.

In some embodiments, the sealing layer comprises a ceramic material, such as an oxide. For example, aluminosilicate materials may be selected because of their utility as environmental barrier coatings for use in such high temperature applications as turbomachinery components. In certain embodiments, the sealing layer comprises a rare-earth aluminosilicate. As used herein, the term "rare-earth aluminosilicate" is broadly applicable to any material that is the product of mixing or reacting at least one rare-earth oxide, silicon oxide, and aluminum oxide, and this term applies to any material having a composition that falls within a ternary isothermal section having rare-earth oxide, silicon oxide, and aluminum oxide at respective apexes, as depicted in FIG. 1. It should be noted that, although a ternary isothermal section is depicted, the rare-earth oxide component may, in some embodiments, encompass more than one rare-earth element, thereby making the overall material a mixture or product of more than three oxides. For example, a composition made by mixing and/or reacting (1) two or more rare-earth oxides, (2) silicon oxide, and (3) aluminum oxide, is considered to be within the scope of the term "rare-earth aluminosilicate" as used herein. In some embodiments, the rare-earth aluminosilicate comprises at least one element selected from the group consisting of yttrium, scandium, gadolinium, dysprosium, holmium, erbium, thulium, ytterbium, and lutetium.

Throughout this description, the composition of the sealing layer will be described in terms of equivalent mole percent of aluminum oxide ($Al_2O_3$, or "alumina"), silicon oxide ($SiO_2$ or "silica"), and rare-earth oxide. This notation is consistent with that commonly used in the art, where, for example, a compound such as yttrium disilicate is often written as $Y_2O_3 \cdot 2SiO_2$ (66.67 mol. % $SiO_2$+33.33 mol. % $Y_2O_3$) instead of $Y_2Si_2O_7$.

Certain rare-earth aluminosilicate compositions provide relative advantages due to their ability to form effective amounts of desirable flowable phases (i.e., liquid or glass), to resist high temperature environments, to be economically processed, or a combination of these or other factors. Generally, the silica, alumina, and rare-earth oxide are provided in relative proportions that enable the formation of a glassy phase or a liquid phase above a temperature of about 900° C. In one embodiment, the rare-earth aluminosilicate comprises up to about 62 mole % silica. In another embodiment, the rare-earth aluminosilicate comprises up to about 60 mole % alumina. In yet another embodiment, the rare-earth aluminosilicate comprises up to about 33 mole % rare-earth oxide.

Depending on the particular application desired for the coating, other rare-earth aluminosilicate compositions may be selected for service. Referring to FIG. 1, in some embodiments the rare-earth aluminosilicate has a maximum silica content that is a function of the respective contents of alumina and rare-earth oxide, defined by a line 10 in alumina/silica/rare-earth oxide compositional space 20 running through a first composition point A at (10 mole % alumina, 62 mole % silica, 28 mole % rare-earth oxide) and a second composition point B at (40.5 mole % alumina, 48.5 mole % silica, 11 mole % rare-earth oxide). In some embodiments, the rare-earth aluminosilicate has a maximum alumina content that is a function of the respective contents of silica and rare-earth oxide, defined by a line 30 in alumina/silica/rare-earth oxide compositional space 20 running through a first composition point B at (40.5 mole % alumina, 48.5 mole % silica, 11 mole % rare-earth oxide) and a second composition point C at (58.3 mole % alumina, 27.8 mole % silica, 14 mole % rare-earth oxide). In some embodiments, the rare-earth aluminosilicate has a maximum rare-earth oxide content that is a function of the respective contents of alumina and silica, defined by a line 40 in alumina/silica/rare-earth oxide compositional space running through a first composition point A at (10 mole % alumina, 62 mole % silica, 28 mole % rare-earth oxide) and a second composition point D at (24.5 mole % alumina, 42.5 mole % silica, 33 mole % rare-earth oxide).

Even further advantageous compositions may be selected based on their ability to form phases having the desirable flow characteristics described previously. In one embodiment, the rare-earth aluminosilicate has a composition in the range bounded by a region in alumina/silica/rare-earth oxide compositional space defined by quadrilateral ABCD in FIG. 1, with points A, B, C, and D as defined above. In certain embodiments, the composition is in the range defined by quadrilateral EFGH in FIG. 1, wherein point E is (12.5 mole % alumina, 61 mole % silica, 26.5 mole % rare-earth oxide); point F is (38.5 mole % alumina, 49.5 mole % silica, 12 mole % rare-earth oxide); point G is (49 mole % alumina, 34 mole % silica, 17 mole % rare-earth oxide); and point H is (24 mole % alumina, 45.5 mole % silica, 30.5 mole % rare-earth oxide). In particular embodiments, the rare earth aluminosilicate has a composition in the range defined by compound line segment EIH in FIG. 1, defined by a first segment EI and a second segment IH, where points E and H are as defined above and point I is (17.5 mole % alumina, 53 mole % silica, 29.5 mole % rare-earth oxide).

FIG. 2 depicts an exemplary article 200 of the present invention. In this particular embodiment, sealing layer 210 is disposed over a substrate 202. Substrate 202 may be made from any suitable material, such as a ceramic, a metal alloy, or an intermetallic material. In some embodiments the substrate comprises a ceramic, for example an oxide, nitride, or carbide. Substrate 202 may include a silicon-containing material, such as silicon nitride, molybdenum disilicide, or silicon carbide. This material, in certain embodiments, is a ceramic-matrix composite material, such as a material made of a matrix phase and a reinforcement phase; in particular embodiments, the matrix phase and the reinforcement phase comprise silicon carbide. In certain embodiments, article 202 is a component of a gas turbine assembly, such as, for example, a combustion liner, transition piece, shroud, vane, or blade. The ability of the sealing layer to protect substrate 202 from exposure to water vapor at high temperatures may be advantageous for its application to silicon-bearing turbine components. It will be understood that although the application of embodiments of the present invention may be described with reference to applications on silicon-bearing substrates for protection against attack by water vapor, such references are exemplary and that embodiments of the present invention include substrate materials other than silicon-bearing materials.

In certain applications, a bondcoat 204 is disposed over substrate 202, with sealing layer 210 disposed over bondcoat 204. Bondcoat 204 may be used, for example, to mitigate thermal stresses or to inhibit chemical reactions between substrate 202 and sealing layer 210. In some embodiments, such as where substrate 202 is a silicon-bearing material, the bondcoat 204 comprises silicon. For example, bondcoat 204 in some embodiments is elemental silicon or a silicide. In particular embodiments, such as where bondcoat contains silicon or silicon oxide, an intermediate layer (not shown) is disposed between sealing layer 210 and bondcoat 204. The intermediate layer is made of a barrier material that is substantially inert with respect to silicon oxide to promote chemical stability in the coating system. "Substantially inert" means that there is at most only incidental interaction (solubility or reactivity) between silica and the barrier material. Rare-earth disilicates, such as disilicates of yttrium, ytterbium, lutetium, scandium, and other rare-earth elements, are non-limiting examples of suitable barrier materials.

A topcoat 206, in some embodiments, is disposed over sealing layer 210. Topcoat 206 may be used to provide thermal insulation (a thermal barrier coating), environmental protection (an environmental barrier coating), or a combination of these functions. The selection of a suitable topcoat material will depend on the type of environment the article is to be exposed to, the composition of the underlying coatings and substrate, the cost of processing, and other factors known in the art. In some embodiments, topcoat 206 is a ceramic material. Many classes of ceramic materials are known for their ability to serve as thermal and/or environmental barrier coatings; these materials include, but are not limited to, silicates, aluminosilicates, and yttria-stabilized zirconia. In certain embodiments, topcoat 206 contains a rare earth monosilicate and/or rare earth disilicate; in particular embodiments, topcoat 206 is a dual-layer coating, with an outer layer of rare earth monosilicate and an inner layer of rare earth disilicate. The rare earth elements associated with these monosilicate and disilicate materials, in some embodiments, may include one or more of yttrium, ytterbium, lutetium, and scandium. A particular example is where the outer layer is yttrium mono silicate and the inner layer is a rare earth disilicate.

The thickness of any of the various coating layers described above is generally chosen to provide adequate protection for a given service time while keeping thermal stresses to a sustainable level. Moreover, coating thickness may also be determined by the ability of a selected coating method to produce a continuous layer over the deposition area. Non-limiting examples of approximate thickness ranges for the various coatings include the following: for the sealing layer, from about 25 micrometers to about 150 micrometers; for the bondcoat, from about 75 micrometers to about 125 micrometers; for the intermediate layer, from about 50 micrometers to about 100 micrometers; for the topcoat layer, from about 50 micrometers to about 250 micrometers. For the dual-layer topcoat embodiment described above, the yttrium monosilicate outer layer can be from about 25 micrometers to about 50 micrometers in certain embodiments.

The coatings described above can be deposited using coating technology known to the art. Embodiments of the present invention are of particular interest where methods for coating deposition are used that typically result in a substantial amount of cracking and internal open porosity. Plasma spray technology and slurry-based coating processes are examples of commonly used coating methods that generate coatings with such features. In such cases, the presence of the sealing layer serves to considerably enhance the hermeticity, and thus the efficacy of protection, of the coating.

In order to activate the self-sealing nature of the sealing layer, the sealing layer is heated to the sealing temperature (described above) at which at least a portion of the sealing layer will flow; the flowable portion thus moves into cracks and pores and, upon solidification, seals off these defects that would otherwise serve as pathways for detrimental species, such as water vapor, from the environment to the substrate. Depending upon the nature of the coating, the economics of the processing, and other factors, the heating step may be performed immediately after depositing the sealing layer, after all coatings have been deposited but prior to putting the finished article into service, or even during service itself if the service temperature is allowed to be sufficiently high.

The sealing temperature is maintained for an effective time to allow time for the flowable material to reach and at least partially fill or otherwise seal off the defects. The length of time needed to achieve this is generally selected based on the number and nature of the defects to be sealed and the quantity of flowable material available in the sealing layer. In one embodiment, the sealing layer is heated to a sealing temperature in a range from about 900° C. to about 1350° C. for a time in the range from about 30 minutes to about 10 hours; in particular embodiments the time is in the range from about 30 minutes to about 4 hours. In some embodiments, the temperature is in the range from about 950° C.-1050° C. for a time in the range from about 30 minutes to about 4 hours, while in other embodiments the temperature is about 1350° C. for a time in this range. The heating step to seal the coating may be performed in air, vacuum, an inert atmosphere, or other environment, depending at least in part on the requirements of the materials being heated (i.e., the substrate and other coating layers, if present).

A method for forming an article 200 according to embodiments of the present invention includes disposing sealing layer 210 over a substrate 202 and heating the sealing layer 210 as described above. In particular embodiments, bondcoat 204 is disposed over the substrate and under the sealing layer 210. In certain embodiments, topcoat 206 is disposed over sealing layer 210. An intermediate layer (not shown) as described above may be disposed between bondcoat 204 and sealing layer 210.

EXAMPLES

Example 1

A silicon carbide ceramic matrix composite substrate was coated by plasma spraying the substrate with a silicon bondcoat and then a rare earth aluminosilicate sealing layer having the following composition: 62 mole % $SiO_2$-13 mole % $Al_2O_3$-25 mole % $RE_2O_3$, where RE in this case was yttrium. The substrate was sectioned and metallographically examined after spraying, and a network of fine cracks was observed throughout the aluminosilicate layer. The coated substrate was then heat treated in air for 4 hours at 1025° C. followed by 10 hours at 1315° C. The heat treated specimen was sectioned and metallographically examined, and the network of fine cracks, visible prior to heat treating, was not visible after heat treating, indicating the cracks had been sealed during the heat treatment step. Air permeability tests showed that the permeability to air of the aluminosilicate layer after heat treatment was at least a factor of ten lower than that measured in the as-sprayed condition, demonstrating an improvement in coating hermeticity.

Example 2

A multi-layered coating assembly comprising a first layer of yttrium disilicate (about 100 micrometers nominal thickness), a second layer of the rare earth aluminosilicate described in Example 1 (about 75 micrometers nominal thickness), and a third layer of yttrium disilicate (about 175 micrometers nominal thickness) was fabricated using plasma spray deposition. Air permeability tests showed that the permeability to air of the multi-layered coating assembly after heat treatment for 10 hours at 1315° C. was at least a factor of ten lower than that measured in the as-sprayed condition, demonstrating an improvement in coating hermeticity.

Example 3

A multi-layered coating assembly comprising a first layer of yttrium disilicate, a second layer of the rare earth aluminosilicate described in Example 1, a third layer of yttrium disilicate, and a fourth layer of yttrium monosilicate was fabricated using plasma spray deposition. The first through third layers were nominally about 75-125 micrometers thick, and the monosilicate layer was nominally about 50-75 micrometers thick. Air permeability tests showed that the permeability to air of the multi-layer assembly after heat treatment (same heat treatment as in Example 1) was at least a factor of ten lower than that measured in the as-sprayed condition, demonstrating an improvement in coating hermeticity.

Example 4

The effectiveness of the sealing layer in slowing the degradation of underlying silicon-bearing layers was demonstrated. Three silicon carbide—silicon carbide ceramic matrix composite specimens were plasma-spray coated with nominally about 100-125 micrometers of silicon as a bondcoat. The first specimen was plasma-spray coated with a layer of yttrium disilicate having a nominal thickness of about 175-200 micrometers. The second specimen was plasma-spray coated with a first layer of yttrium disilicate having nominal thickness of about 75-100 micrometers, a middle (sealing) layer of the rare-earth aluminosilicate of Example 1 having a nominal thickness of about 75-100 micrometers, and an outer layer of yttrium disilicate having nominal thickness of about 175-200 micrometers. The third specimen was plasma spray coated using a layer architecture similar to the second specimen but with an additional outer layer of yttrium monosililcate that was nominally 50-75 um thick. The three specimens were exposed to multiple 2-hour exposure cycles in a 90% water vapor/10% oxygen environment at 1315° C. After 500 hours of exposure, the specimens were sectioned and metallographically examined for microstructural evaluations and to measure the thickness of the oxide scale formed at the interface between the silicon bond layer and the upper yttrium disilicate layer. The silicon bondcoat of the first specimen had an oxide layer with a thickness of about a factor of 5 higher than those measured for the second and the third specimens, demonstrating that the improved hermeticity achieved by the presence of the sealing layer in the second and third specimens considerably inhibited bondcoat degradation due to influx of environmental species.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for making an article, comprising:
providing a substrate;
disposing a self-sealing layer comprising a rare-earth aluminosilicate over the substrate, wherein the rare-earth aluminosilicate has a composition in the range bounded by a region in alumina/silica/rare-earth oxide compositional space defined by
a first line connecting a first composition point at (10 mole % alumina, 62 mole % silica, 28 mole % rare-earth oxide) with a second composition point at (40.5 mole % alumina, 48.5 mole % silica, 11 mole % rare-earth oxide),
a second line connecting a third composition point at (58.3 mole % alumina, 27.8 mole % silica, 14 mole % rare-earth oxide) with a fourth composition point at (24.5 mole % alumina, 42.5 mole % silica, 33 mole % rare-earth oxide),
a third line connecting the first composition point with the fourth composition point, and
a fourth line connecting the second composition point with the third composition point; and
heating the self-sealing layer to a sealing temperature at which at least a portion of the sealing layer will flow.

2. The method of claim 1, wherein heating further comprises maintaining the sealing layer at the sealing temperature for an effective time to form a substantially hermetic layer.

3. The method of claim 1, further comprising disposing an intermediate layer between the sealing layer and the bondcoat, wherein the intermediate layer comprises a barrier material that is substantially inert with respect to silica.

4. The method of claim 3, wherein the barrier material comprises yttrium disilicate.

5. The method of claim 1, wherein the rare-earth aluminosilicate comprises at least one element selected from the group consisting of yttrium, scandium, gadolinium, dysprosium, holmium, erbium, thulium, ytterbium, and lutetium.

6. The method of claim 1, wherein the rare-earth aluminosilicate has a composition in the range bounded by a region in alumina/silica/rare-earth oxide compositional space defined by
a first line connecting a first composition point at (12.5 mole % alumina, 61 mole % silica, 26.5 mole % rare-earth oxide) with a second composition point at (38.5 mole % alumina, 49.5 mole % silica, 12 mole % rare-earth oxide);
a second line connecting a third composition point at (49 mole % alumina, 34 mole % silica, 17 mole % rare-earth oxide) with a fourth composition point at (24 mole % alumina, 45.5 mole % silica, 30.5 mole % rare-earth oxide);
a third line connecting the first composition point with the fourth composition point; and
a fourth line connecting the second composition point with the third composition point.

7. The method of claim 1, wherein the rare earth aluminosilicate has a composition in the range defined by a compound line segment in alumina/silica/rare-earth oxide compositional space defined by a first segment joining a first composition point at (10 mole % alumina, 62 mole % silica, 28 mole % rare-earth oxide) to a second composition point at (17.5 mole % alumina, 53 mole % silica, 29.5 mole % rare-earth oxide), and a second segment joining said second composition point to a third composition point at (24 mole % alumina, 45.5 mole % silica, 30.5 mole % rare-earth oxide).

8. The method of claim 1, wherein the heating step is performed prior to introducing the article into service.

9. The method of claim 1, wherein the substrate comprises silicon.

10. The method of claim 1, wherein the substrate comprises a ceramic matrix composite material.

11. The method of claim 1, wherein the article is a component of a gas turbine assembly.

12. The method of claim 1, further comprising disposing a topcoat over the sealing layer.

13. The method of claim 12, wherein the topcoat comprises a ceramic material selected from the group consisting of silicates, aluminosilicates, and yttria-stabilized zirconia.

14. The method of claim 1, further comprising disposing a bondcoat between the substrate and the sealing layer.

15. The method of claim 14, wherein the bondcoat comprises silicon.

16. The method of claim 15, wherein the bondcoat comprises at least one material selected from the group consisting of elemental silicon and a silicide.

17. A method for making an article, comprising:
providing a substrate comprising silicon;
disposing a bondcoat over the substrate, the bondcoat comprising silicon;
disposing an intermediate layer over the bondcoat, wherein the intermediate layer comprises a barrier material that is substantially inert with respect to silica;
disposing a self-sealing layer over the intermediate layer, the sealing layer comprising a rare earth aluminosilicate having a composition in the range bounded by a region in alumina/silica/rare-earth oxide compositional space defined by
a first line connecting a first composition point at (10 mole % alumina, 62 mole % silica, 28 mole % rare-earth oxide) with a second composition point at (40.5 mole % alumina, 48.5 mole % silica, 11 mole % rare-earth oxide);
a second line connecting a third composition point at (58.3 mole % alumina, 27.8 mole % silica, 14 mole % rare-earth oxide) with a fourth composition point at (24.5 mole % alumina, 42.5 mole % silica, 33 mole % rare-earth oxide);
a third line connecting the first composition point with the fourth composition point; and
a fourth line connecting the second composition point with the third composition point;
heating the sealing layer to a sealing temperature at which at least a portion of the sealing layer will flow and maintaining the sealing layer at the sealing temperature for an effective time to form a substantially hermetic layer;
and
disposing a topcoat over the sealing layer.

* * * * *